United States Patent [19]

Achelpohl

[11] Patent Number: 4,473,431

[45] Date of Patent: Sep. 25, 1984

[54] APPARATUS FOR MAKING PLASTIC MATERIAL BAGS AND FOR DEPOSITING THEM IN GROUPS

[75] Inventor: Fritz Achelpohl, Lengerich, Fed. Rep. of Germany

[73] Assignee: Windmöller & Hölscher, Lengerich, Fed. Rep. of Germany

[21] Appl. No.: 459,537

[22] PCT Filed: May 13, 1982

[86] PCT No.: PCT/EP82/00101

§ 371 Date: Jan. 13, 1983

§ 102(e) Date: Jan. 13, 1983

[87] PCT Pub. No.: WO82/04011

PCT Pub. Date: Nov. 25, 1982

[30] Foreign Application Priority Data

May 13, 1981 [DE] Fed. Rep. of Germany ....... 3119005
Nov. 19, 1981 [DE] Fed. Rep. of Germany ....... 3145869

[51] Int. Cl.[3] .............................................. B32B 31/18

[52] U.S. Cl. .................................... 156/510; 156/512; 271/196; 271/197

[58] Field of Search ............... 156/433, 494, 497, 510, 156/512, 526; 271/196, 197, 265, 266, 303

[56] References Cited

U.S. PATENT DOCUMENTS 3,218,897 11/1965 Geigenmiller et al. ............ 271/196
3,232,605 1/1966 Plummer et al. .
3,315,956 4/1967 Lyman .
4,221,377 9/1980 Bodewein et al. .................. 271/196
4,247,094 1/1981 Vits .................................... 271/196
4,308,021 12/1981 Achelpohl .......................... 271/196

FOREIGN PATENT DOCUMENTS 2428523 8/1979 France .
2026988 7/1979 United Kingdom .

*Primary Examiner*—Caleb Weston
*Attorney, Agent, or Firm*—Fleit, Jacobson, Cohn & Price

[57] ABSTRACT

This invention relates to apparatus for making plastic material bags from an intermittently advanced, flattened tubular film web comprising retaining means which in the direction of advance of the tubular film web succeed transverse cutting means and serve to retain adjacent to its open end rim the last bag which has been severed from the tubular film web. To provide such apparatus which is structurally simple and can be used to make imperforate bags, the retaining means consist of a suction box (32), which adjacent to the transport plane is provided with suction holes arranged in two rows (33, 34), which extend transversely to the direction of travel and have a spacing which is approximately as large as the pitch of the shingled groups of bags. A pressure roller (35) which is adapted to be raised and lowered is adapted to be lowered onto the last bag which has been deposited and cooperates with a backpressure roller (37), which is disposed under the upper course of the conveyor belt (5). The pressure roller is controlled in such a manner that it is lowered substantially only during the intermittent advance of the conveyor belt (5).

4 Claims, 1 Drawing Figure

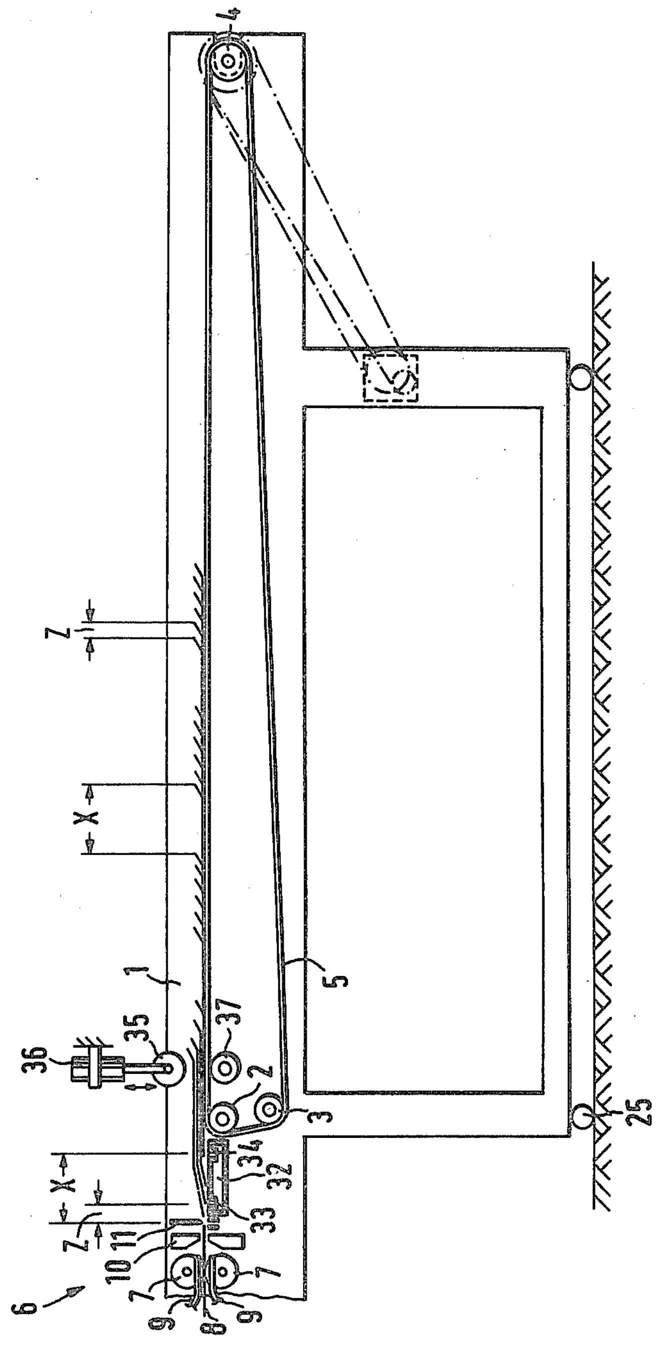
4
Z
X
1
5
35
36
37
2
3
25
34
32
33
X
Z
11
10
7
7
6
9
8
9

APPARATUS FOR MAKING PLASTIC MATERIAL BAGS AND FOR DEPOSITING THEM IN GROUPS

This invention relates to apparatus for making plastic material bags from a flattened tubular film web which is intermittently advanced and for depositing them in groups on a conveyor belt which is adapted to be intermittently driven, comprising air blast nozzles, which are disposed on both sides of the tubular film web and project the advanced leading end of the tubular film web in a stretched condition, cyclically operated transverse welding and transverse cutting means for providing the bags with end seam welds and for severing the bags from the tubular film web, and retaining means, which in the direction of advance of the tubular film web succeed the transverse cutting means and serve to retain the last bag severed from the tubular film web adjacent to the opened rim of said bag.

In apparatus of that kind which is known from Laid-open German Application No. 28 33 236 for retaining means comprise two rows of needles, which interdigitate like combs and extend through slots in a support plate, which bridges the gap between the cutting means and the belt conveyor and are secured to supports, which are disposed below said cover plate and provided with drive means and move the rows in alternation from a pinning position, in which the needles extend above the support plate, to a position in which the needles are extended toward the conveyor belt. Before or at the beginning of the advance of a row, the other row, which is in its advanced position, is retracted from the stack under the support plate and moved to its pinning position during the advance. During the advance of each row of needles, the drive for the conveyor belt is operated so that the next following bag is the first to be pinned on the row of needles which are in pinning position and that bag overlaps like a shingle the stack which has been pushed off. The air blast flowing over the stacks of bags cannot derange the stacks because the bags are either pinned on and retained by a row of needles or the stacks are covered by the bag or bags of the following stack as by shingles.

The known machine involves a substantial expenditure and can be used only to make bags having open end rims which have been perforated by the retaining needles.

For this reason it is an object of the invention to provide apparatus which is of the kind described first hereinbefore and which is structurally simple and can be used to make imperforate bags.

This object is accomplished according to the invention in that the retaining means consist of a suction box, which adjacent the transport plane is provided with suction holes arranged in two rows, which extend transversely to the direction of advance and have spacing which is approximately as large as the pitch of the shingled group of bags, a pressure roller is provided, which is adapted to be raised and lowered and adapted to be lowered onto the last bag which has been deposited, said pressure roller cooperates with a backpressure roller, which is disposed under the upper course of the conveyor belt and the pressure roller is so controlled that it is lowered substantially only during the intermittent advance of the conveyor belt. In each group which has been deposited, the shingled bags have a pitch which is approximately as large as the distance from the transverse cutting means to the first row of suction holes. The end of the tubular film web is projected by the air blast to a position under the pressure roller which can be lowered. When the tubular film web is depressed by the cutting knife or another part of the cutting means, the pressure roller is lowered and the drive for the conveyor belt is started at the same time so that the open end rim of the last but one bag, which rim has been sucked by the rear row of suction holes, is pulled off and the bag which has been formed last is pulled over the row of suction holes until the open end rim of said bag just covers said row of suction holes.

By control means, the apparatus is controlled in such a manner that after a group consisting of shingled bags in a predetermined number has been deposited and the pressure roller has been lowered the drive for the conveyor belt is operated until the upen end rim of the last bag of that group is disposed over the first row of suction holes and is sucked by the latter. The open end rim of the next following bag is sucked by the rear row of suction holes so that larger distances between the shingles are provided for the formation of the groups. Each group of plastic material bags can be removed from the belt conveyor and packaged by hand or by machine. When the groups of bags of plastic material are removed by hand, the larger shingle pitch makes it easier for the packer to remove the sacks from the conveyor belt and to fill, e.g., cartons always with the same number of bags or sacks.

An illustrative embodiment of the invention will be explained more fully hereinafter with reference to the drawing, which in its single figure shows diagrammatically in side elevation the apparatus for making bags and for depositing them in groups.

Rear upper and rear lower conveyor belt pulleys 2, 3 are mounted between the lateral frame walls 1 of the machine. The divided conveyor belts 5 are trained around these conveyor belt pulleys 2, 3 and around forward conveyor belt pulleys 4, which are also mounted between the lateral frame walls 1.

The conveyor belt 5 is preceded by the transverse welding and transverse cutting device 6, which comprises a pair of feed rollers 7, by which the tubular film web 8, which has been withdrawn, e.g., from a supply roll, is intermittently advanced in steps corresponding to one bag or sack length. Air blast nozzles 9 are provided on both sides of the tubular film web 8 in annular grooves of the feed rollers 7 and project the lead end of the tubular film web 8 in a stretched condition. The feed rollers 7 are succeeded in the direction of advance by transverse welding means 10 and transverse cutting means 11. The apparatus described thus bar is of known design.

A suction box 32 is disposed between the transverse cutting means 11 and the rear reversing pulley 2. That suction box 32 is connected to a suction air source by means not shown and comprises two transversely extending, spaced apart rows 33, 34 of suction holes. The spacing of said suction hole rows 33, 34 is as large as the pitch X of the shingled groups of bags or sacks which lie on the conveyor belt 5.

The distance from the rear suction holes row 33 of sucction holes to the transverse cutting means 11 is equal to a single shingle pitch Z of the bags or sacks in each group.

A pressure roller 35 is provided near the ends of the freely projecting leading ends of the tubular film webs and is actuated by a fluid-operated piston-cylinder unit 36, the cylinder of which is fixed to the frame. A backpressure roller 37 is disposed below the pressure roller 35 under the conveyor belt 5. By means of the lowered pressure roller, the sacks or bags lying on the conveyor belt are forced against the backpressure roller so that the sacks or bags are held in frictional contact with each other and with the conveyor belt. For an adaptation to different bag lengths, the pressure roller 35 and the backpressure roller 37 are displaceable in and opposite to the direction of travel.

The pressure roller 35 descends onto the backpressure roller 37 as soon as the knife of the transverse cutting means 11 has been severed from the tubular film web 8 and remains in its lower position until the rear open end of that sack or bag workpiece lies over the rear row 33 of suction holes of the suction box 32 and is sucked by the latter. The pressure roller 35 is subsequently raised and the next following sack or bag workpiece is carried out by the air blast over the sack or bag workpiece which is held by the row 33 of suction holes. Control means, not shown, are provided, by which that operation is repeated until a desired member of sack workpieces which are shingled in a group have been deposited on the conveyor belt 5. By a suitable control action, a larger shingle spacing X is then formed. For this purpose the pressure roller 35 is forced onto the backpressure roller 37 until the upper sack workpiece has been pulled over the row 33 of suction holes as far as to the forward row 34 of suction holes and is held by the latter. The next following sack workpiece is then forced unto the backpressure roller 37 by the pressure roller 35 only until the open end of said sack workpiece is diposed over the rear row 33 of suction holes and is retained by said row.

The air blast nozzles 9 intermittently deliver an air blast which is shut off as long as the bags are advanced by the pressure roller 35. As soon as a bag has been projected in stretched condition, the air is shut off and the hot wire welding operation is initiated. The last bag which has been welded and severed is then advanced by the pressure roller 35 to the extent which determines the shingle pitch until that bag has been advanced to the succeeding row of suction holes in the direction of travel and is retained by said row. Only thereafter is the next following bag projected by the air blast so that there is no unretained bag when the air blast is started.

This control action results in the formation of shingles in such a manner that groups of sacks or bags have a larger shingle pitch X. The vacuum for the suction air box 32 is selected so that the air blast for projecting the sack workpieces cannot lift the bag end from the row 33 or 34 of suction holes and that the sack workpieces can easily be pulled from the row 33 or 34 of suction holes and that the sack workpieces can easily be pulled from the suction box 32 when the pressure roller 35 has been lowered.

The frame for the conveyor belt 5 is movable on rollers 25 so that it can be moved away from and returned to the transverse welding and cutting device 6 when it is desired to replace, e.g., the suction box 32.

The suction box 32 is suitably provided with suction holes or suction slots throughout its length. That design ensures that the ends of the bags will always be sucked and retained by the suction holes or suction slots of the suction box and the desired shingle pitch is determined only by the advance which is effected by the pressure roller. The use of such suction box eliminates the need for an intermittent application and shutting off of suction air for projecting the end of the tubular web because each new bag which has been formed is sucked and retained in its rear portion as the welding bar or the cutting knife is lowered. The suction force should be so selected that the rear ends of the bags are sufficiently retained and that the bags can easily be pulled away from the suction box by the pressure roller.

I claim:

1. Apparatus for making plastic material bags from a flattened tubular film web which is intermittently advanced and for depositing the bags in groups on a conveyor belt which is adapted to be intermittently driven, said apparatus comprising:

air blast nozzles, positioned on both sides of the tubular film web and project the advanced leading end of the tubular film web in a stretched condition, cyclically operated transverse welding and transverse cutting means for providing the bags with end seam welds and for severing the bags from the tubular film web, retaining means, which in the direction of advance of the tubular web succeed the transverse cutting means and serve to retain the last bag severed from the tubular film web adjacent to the cutting means at the trailing end of said bag, characterized in that the retaining means consist of a suction box, positioned adjacent to the transport plane, said suction box defining suction holes arranged in two rows, extending transversely to the direction of advance of the web and the rows of suction holes being spaced from each other a distance which is approximately as large as the pitch between the shingled groups of bags, a pressure roller is adapted to be raised and lowered and adapted to be lowered onto the last bag which has been deposited on the conveyor belt, said pressure roller cooperates with a backpressure roller, positioned under the upper course of the conveyor belt, and control means for controlling the pressure roller so that the pressure roller is lowered during the intermittent advance of the conveyor belt, said conveyor belt advancing until the bags cut from the tubular film web are each, in sequence, advanced and held at the trailing end of the bag by the row of suction holes closest to the transverse cutting means and are then advanced towards the other row of suction holes by the subsequent advancement of the conveyor belt.

2. An apparatus as claimed in claim 1, wherein a plurality of sucking openings are defined by said suction box and are positioned throughout the length of said suction box.

3. An apparatus as claimed in claim 1, wherein said conveyor belt is advanced and said pressure roller is lowered at the same time as when the tubular film web is depressed by the cutting means.

4. An apparatus as claimed in claim 1, wherein said conveyor belt is intermittently advanced until a group of a predetermined number of bags is stacked in a shingled condition and the trailing end of the last bag cut from the tubular film web is advanced and held by the row of suction holes furthest from the transverse cutting means to subdivide the group formed from a following group of bags.

* * * * *